United States Patent
Bulat et al.

(10) Patent No.: US 12,374,109 B2
(45) Date of Patent: Jul. 29, 2025

(54) METHOD AND APPARATUS FOR VIDEO RECOGNITION

(71) Applicant: SAMSUNG ELECTRONICS CO., LTD., Suwon-si (KR)

(72) Inventors: Adrian Bulat, Middlesex (GB); Georgios Tzimiropoulos, Middlesex (GB); Juan-Manuel Perez-Rua, Middlesex (GB); Swathikiran Sudhakaran, Middlesex (GB); Brais Martinez, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/960,760

(22) Filed: Oct. 5, 2022

(65) Prior Publication Data

US 2023/0046066 A1    Feb. 16, 2023

Related U.S. Application Data

(63) Continuation of application No. PCT/KR2022/007335, filed on May 24, 2022.

(30) Foreign Application Priority Data

May 25, 2021  (GR) .............................. 20210100346
May 18, 2022  (GB) ................................... 2207295

(51) Int. Cl.
*G06V 20/40*  (2022.01)
*G06V 10/77*  (2022.01)
(Continued)

(52) U.S. Cl.
CPC .......... *G06V 20/41* (2022.01); *G06V 10/7715* (2022.01); *G06V 20/46* (2022.01);
(Continued)

(58) Field of Classification Search
CPC .... G06V 20/41; G06V 10/7715; G06V 20/46; G06V 20/49; G06V 10/454; G06V 10/82;
(Continued)

(56) References Cited

U.S. PATENT DOCUMENTS 6,968,008 B1   11/2005   Ribas-corbera et al.
9,740,949 B1   8/2017    Khosla et al.
(Continued)

FOREIGN PATENT DOCUMENTS

CN     106228162    12/2016
CN     112036276    12/2020
(Continued)

OTHER PUBLICATIONS

Arnab Anurag et al., "ViViT: A Video Vision Transformer", arXiv:2103.15691v2, Nov. 1, 2021, 14 pages.
(Continued)

*Primary Examiner* — Santiago Garcia
(74) *Attorney, Agent, or Firm* — Nixon & Vanderhye P.C.

(57) ABSTRACT

Broadly speaking, the present techniques generally relate to a method and apparatus for video recognition, and in particular relate to a computer-implemented method for performing video recognition using a transformer-based machine learning, ML, model. Put another way, the present techniques provide new methods of image processing in order to automatically extract feature information from a video.

19 Claims, 11 Drawing Sheets

(51) Int. Cl.
*H04N 23/61* (2023.01)
*H04N 23/667* (2023.01)

(52) U.S. Cl.
CPC ............. *G06V 20/49* (2022.01); *H04N 23/61* (2023.01); *H04N 23/667* (2023.01)

(58) Field of Classification Search
CPC ........ G06V 10/62; G06V 20/40; G06V 40/20; H04N 23/61; H04N 23/667; G06N 3/045; G06N 3/04

See application file for complete search history.

(56) References Cited

U.S. PATENT DOCUMENTS

| | | | |
|---|---|---|---|
| 10,089,556 | B1 | 10/2018 | Xu |
| 10,121,254 | B2 | 11/2018 | Wang et al. |
| 10,395,098 | B2 | 8/2019 | Hwang et al. |
| 10,867,184 | B2 | 12/2020 | Choutas et al. |
| 11,468,318 | B2 * | 10/2022 | Liu .................... H04N 7/0127 |
| 2009/0175494 | A1 * | 7/2009 | Vial ................... H04N 1/32288 382/100 |
| 2012/0288140 | A1 * | 11/2012 | Hauptmann ............ G06T 7/292 382/103 |
| 2015/0104116 | A1 * | 4/2015 | Salvador ............. H04N 7/0117 382/300 |
| 2015/0324662 | A1 | 11/2015 | Garg et al. |
| 2019/0019037 | A1 | 1/2019 | Kadav et al. |
| 2020/0012940 | A1 | 1/2020 | Liu et al. |
| 2020/0042837 | A1 * | 2/2020 | Skinner ................ H04L 63/102 |
| 2021/0136416 | A1 | 5/2021 | Kim et al. |
| 2021/0386343 | A1 * | 12/2021 | Goldenberg ........... A61B 5/164 |
| 2022/0351516 | A1 * | 11/2022 | Vijayanarasimhan ...................... G06V 20/41 |

FOREIGN PATENT DOCUMENTS

| | | |
|---|---|---|
| JP | 2009-273157 | 11/2009 |
| KR | 10-2017-0096492 | 8/2017 |

OTHER PUBLICATIONS

Raghav Goyal et al., "The "something something" video database for learning and evaluating visual common sense", ICCV Paper—Open Access, (2017), 9 pages, IEEE Xplore.
Wu Bichen et al., "Shift: A Zero FLOP, Zero Parameter Alternative to Spatial Convolutions", CVPR Paper—Open Access Version, (2018), 9 pages., Computer Vision Foundation, IEEE Xplore.
International Search Report for PCT/KR2022/007335 dated Sep. 13, 2022, 3 pages.
Written Opinion of the ISA for PCT/KR2022/007335 dated Sep. 13, 2022, 3 pages.
Coccomini, "On Transformers, TimeSformers, and Attention", Towards Data Science, Retrieved from the Internet: <URL: https://towardsdatascience.com/transformers-an-exciting-revolutionfrom-text-to-videos-dc70a15e617b>, Mar. 31, 2021, 12 pages.
Dosovitskiy et al., "An Image is Worth 16×16 Words: Transformers for Image Recognition at Scale", Jun. 3, 2021, pp. 1-22.
Deng, et al., "Image Net: A Large-Scale Hierarchical Image Database", https://www.researchgate.net/publication/221361415, Jun. 2009, 9 pages.
Bertasius et al., "Is Space-Time Attention All You Need for Video Understanding?", 2012, 3 pages.
Damen et al, "Rescaling Egocentric Vision", Jun. 23, 2020, 26 pages.
Search Report issued by the United Kingdom Patent Office for United Kingdom Patent Application No. 2207295.3, Nov. 15, 2022.

* cited by examiner

Spatial-only attention:$O(TS^2)$

Present technique:
$O(TS^2)$

METHOD AND APPARATUS FOR VIDEO RECOGNITION

CROSS-REFERENCE TO RELATED APPLICATION(S)

This application is a bypass continuation application of International Application No. PCT/KR2022/007335, filed on May 24, 2022, in the Korean Intellectual Property Office and claiming priority to Patent Application No. GB2207295.3, filed May 18, 2022 in the Intellectual Property Office and Patent Application No. GR20210100346, filed May 25, 2021 in the Intellectual Property Office, the disclosures of which are incorporated by reference herein in their entireties.

BACKGROUND

1. Field

The present application generally relates to a method and apparatus for video recognition. In particular, the present application provides a computer-implemented method for performing video recognition using a transformer-based machine learning, ML, model.

2. Description of the Related Art

Video recognition—analogous to image recognition—refers to the problem of recognizing events of interest in video sequences. Applications of video recognition include recognising human activities within videos, such as whether a person is cooking or riding a bike, or recognising emotions of people within videos, such as whether a person is happy or sad or confused.

Existing approaches for efficient video understanding either make use of depth-wise three-dimensional (3D) convolutions, directly use modified two-dimensional (2D) convolutional neural networks (CNNs), or combine the two using mid-level temporal fusion.

Transformers have been shown to be tremendously successful on sequenced data, such as natural language processing, however very recently have also been shown to outperform convolutional neural networks (CNNs) for image recognition. This has signalled a major paradigm shift on how image understanding models should be constructed. Transformers now look like a potentially appealing solution for strengthening the video understanding models, that combine visual and temporal data analysis.

Adapting image recognition to video recognition typically involves the extension of Transformers from the spatial to spatio-temporal domain by performing the Transformer's self-attention simultaneously (i.e., jointly) across all spatial (S) and temporal (T) dimensions. Full space-time attention therefore has a complexity $O(T^2S^2)$ which is computationally heavy even for single images. Transformers tend to be memory—and, to some extent, computationally—constrained, making video recognition models impractical even when compared with the 3D based convolutional models.

The present applicant has recognised the need for an improved Transformer-based machine learning, ML, model for understanding videos.

SUMMARY

Generally speaking, the present techniques advantageously exploit the temporal information present in video streams while minimizing the computational burden within the transformers framework, in order to perform video recognition.

In a first approach of the present techniques, there is provided a computer implemented method for performing video recognition using a transformer-based machine learning, ML, model, the method comprising: receiving a video comprising a plurality of frames, the video depicting at least one feature to be identified; defining a temporal window comprising at least three frames from the received video; and performing a single spatial attention, using the transformer-based ML model, over the frames in the temporal window to identify at least one feature.

As explained in more detail below, the present techniques advantageously restrict time attention to a local temporal window. That is, instead of performing spatial and temporal attention for each frame or a patch of a frame individually at each time point, in the present techniques spatial attention is performed over the frames in the temporal window. This means that each point in time (i.e. each frame) does not need to be analysed separately, which reduces the amount of processing that needs to be performed, thereby making the present techniques suitable for use by constrained resource devices (such as smartphones).

Defining a temporal window may comprise: dividing each frame of the plurality of frames into a plurality of patches, and adding position information and temporal information to each patch; selecting at least three frames from the plurality of frames; selecting, using the position information, a patch located at an identical position within each of the at least three frames; and defining a temporal window using the selected patches. As noted above, transformer-based models have been used successfully for natural language processing. To enable a transformer-based model to process a video or image, each frame or image is divided into patches so that a sequence of linear embeddings of these patches can be input into the transformer. Image patches are treated the same way by the transformer as tokens (i.e. words) in a natural language processing application.

Adding position information and temporal information ensures that information relating to the location of each patch within space and time is preserved. This is important since self-attention is permutation invariant. Each frame may be divided into any suitable number of patches. For example, each frame may be divided into k×k non-overlapping patches, where k is an integer.

The method may further comprise: forming a patch sequence using the selected patches; and prepending a classification token to the patch sequence.

Performing spatial attention using the transformer-based ML model may comprise: inputting the patch sequence and classification token into transformer layers of the transformer-based ML model to perform spatial-only attention.

The method may further comprise performing temporal averaging on the classification tokens appended to each patch sequence to obtain a feature for input into a classifier of the transformer-based ML model.

Once the feature has been classified, the method may further comprise storing the received video together with: at least one class as determined by the classifier, and information indicating when the at least one class appears in the video. In this way, the video is stored with at least one class, and the feature matching the class can be readily located in the video. The latter is particularly useful if the video is longer than a few minutes for example.

Defining a temporal window may further comprise: shifting a predefined number of channels of each patch to another patch in the temporal window, such that each patch contains channels from different times. Advantageously, space-time mixing is used to attend, jointly, spatial and temporal locations without inducing any additional cost on top of the spatial-only attention model. Shifting means that for each patch at time t, some of the channels of that patch will be sourced from the same patch (i.e. the same position within another frame in the temporal window) at a different point in time. This means that the patches are temporally-mixed, which in turn means that only spatial attention needs to be performed. Advantageously, this reduces the complexity of the spatio-temporal attention from quadratic in both the spatial and temporal terms to linear in the temporal term. The mixing technique simultaneously prevents performance degradation and increases robustness. Channel shifting has the advantage of reducing the dimensionality of the output from the Transformer model, thereby providing further efficiency gains for devices running the present techniques.

The space-time mixing attention process provides a mechanism that gradually covers the entire video by means of increasing the receptive field size as the model advances in the architecture's depth. Furthermore, the model approximates local temporal attention using temporal mixing of the Transformer key and value tokens, such that channels of the tokens at time t will be sourced from adjacent tokens (preferably, half the channels). Thus, the attention complexity is reduced from quadratic to linear, while preventing performance degradation and increasing robustness, including simultaneously providing improving efficiency at least in accuracy of results and floating-point operations per second (FLOPs).

The present techniques provide stronger long-distance temporal modelling which is significantly more data efficient. The model discussed herein matches and surpasses current state-of-the-art Video Transformer models using only 3 views (e.g., 3×8 frames) instead of 30 views (e.g. 30×8 frames). This makes the present techniques suitable for both resource-constrained and unconstrained computing.

When the temporal window comprises patches from a first frame, a second frame and a third frame, shifting a predefined number of channels comprises: shifting a predefined number of channels from the first frame to the second frame; and shifting the predefined number of channels from the third frame to the second frame. For example, the first frame may be t−1, the second frame may be t, and the third frame may be t+1. Thus, some channels from the t−1th frame may be shifted to the t-th frame, and similarly, some channels form the t+1th frame may be shifted to the t-th frame.

In one example, the predefined number may be a quarter of a total number of channels for each patch/frame. That is, in the example above, 25% of the channels from the t−1th frame and the t+1th frame may be shifted to the t-th frame. In this way, the current patch, taken from the t-th frame, may comprise 50% of the channels from the current patch and 25% from a previous (backward) patch and 25% from a subsequent (forward) patch.

In another example, the predefined number may be up to half of a total number of channels for each patch.

The temporal window may comprise adjacent frames of the plurality of frames of the video. Alternatively, the temporal window may comprise non-adjacent frames of the plurality of frames of the video.

The temporal window may comprise up to five frames of the plurality of frames of the video.

The method may further comprise moving the temporal window along the plurality of frames of the video and repeating the feature identification process. That is, once the processing has been performed using one set of patches, it may be continued using another set of patches. The patches in each set may overlap.

In a second approach of the present techniques, there is provided an apparatus for performing video recognition using a transformer-based machine learning, ML, model, the apparatus comprising: at least one processor coupled to memory and arranged to: receive a video comprising a plurality of frames, the video depicting at least one feature to be identified; define a temporal window comprising at least three frames from the received video; and perform a single spatial attention, using the transformer-based ML model, over the frames in the temporal window to identify at least one feature.

The features described above in relation to the first approach apply equally to the second approach and therefore, for the sake of conciseness, are not repeated.

The apparatus may further comprise at least one image capture device configured to capture the video comprising a plurality of frames. The image capture device may be a camera.

The apparatus may further comprise: analysing, using the at least one processor, the received video in real-time using the feature identification process. Thus, advantageously, the present techniques can not only be used on resource-constrained devices, but can also be used in real-time to analyse videos being captured by the at least one image capture device in real- or near real-time.

Real-time analysis may be useful for a number of reasons. For example the at least one processor may be used to: identify using the analysing, one or more actions or gestures in the received video; and/or identify, using the analysing, one or more objects in the received video. Gesture or action recognition may be useful because it may enable a user to control the video capture process using actions.

It may also enable a capture mode of the image capture device to be adjusted based on what objects or actions or gestures are identified in the video. For example, when the video recognition process determines that the video features a sport being played or other fast-moving action, then it may be useful for the capturing mode to change (to, for example, a more suitable number of frames per second, or to slow motion mode, or at a very high resolution) so that the action can be better recorded. Thus, the at least one processor may be used to: control a capture mode of the at least one image capture device in response to the analysing.

In another example, the received video may comprises a user performing at least one action, such as cooking or exercise. The at least one processor may be arranged to: provide feedback to the user, via a user interface, based on the at least one action performed by the user. This may enable an AI instructor or AI assistant to understand what the user is doing in real-time and provide suitable information to the user. For example, the AI instructor/assistant may provide assistance or guidance to the user if the user does not appear to be performing an exercise correctly, or may provide motivational information to the user to encourage them to continue performing the exercise. The user's emotional state may be determined using the video recognition process and this may enable the AI instructor to react to the user's emotional state. For example, if the user is struggling with an exercise routine, the AI instructor may output motivational information or may encourage the user to take a short break.

The video recognition process may also function on pre-recorded videos. Thus, the apparatus may further comprise: storage storing at least one video; and at least one interface for receiving a user query. The at least one processor may be arranged to: receive, via the at least one interface, a user query requesting any video from the storage that contains a specific feature; use the feature identification process to identify any video containing the specific feature; and output each video containing the specific feature to the user via the at least one interface. For example, the user query may be "Hey Bixby, find videos on my gallery where my dog is jumping". The feature identification process may be used to identify any video in the storage that shows the user's dog jumping, and then these videos may be output to the user. The user may speak or type their query, and the output may be displayed on a display screen of the apparatus or a response may be output via a speaker (e.g. "We have found two videos of your dog jumping").

In this example, the at least one processor may be arranged to store, with each video containing the specific feature: the class corresponding to the specific feature, and information indicating when the class appears in the video. Thus, the identified videos may be labelled with the class such that the videos can be output in the future without needing to perform the feature identification process again (for the same feature(s)).

In another example, the videos may already be classified. The apparatus may further comprise: storage storing a plurality of videos, wherein each video is labelled with at least one class and information indicating when the at least one class appears in the video; and at least one interface for receiving a user query. The at least one processor may be arranged to: receive, via the at least one interface, a user query requesting any video from the storage that contains a specific feature; search the storage for any video labelled with a class corresponding to the specific feature; and output each video containing the specific feature to the user via the at least one interface. Thus, as the videos have already been labelled, the processor may simply perform a search using the class/labels. The classification of the videos may be performed on user command, or may be automatically performed when a new video is stored. In the latter case, the video recognition process may be automatically performed when the apparatus is not being used by the user, such as when the apparatus is being charged or when the apparatus is in 'sleep mode' (defined by the user based on when they go to sleep), so that the resources of the apparatus are not used at a time when the user needs to use the apparatus for another purpose.

The at least one processor may output a whole video containing the specific feature or a segment of the video containing the specific feature, wherein the segment includes the specific feature. That is, the whole video may be output where the specific feature is located somewhere in the video, or a highlight segment may be output which shows the specific feature itself. The highlight segment is advantageous when the whole video is more than a few minutes long. For example, the whole video may be of the user's child playing a football game, but the user may only want to see the part in the video where the user's child scores a goal. The whole video may be over an hour long, so the highlight segment is useful as it means the user does not have to watch or skip through the video to find the moment when the user's child scores a goal.

In a related approach of the present techniques, there is provided a computer-readable storage medium comprising instructions which, when executed by a processor, causes the processor to carry out the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which.

DETAILED DESCRIPTION

Figure 1A:
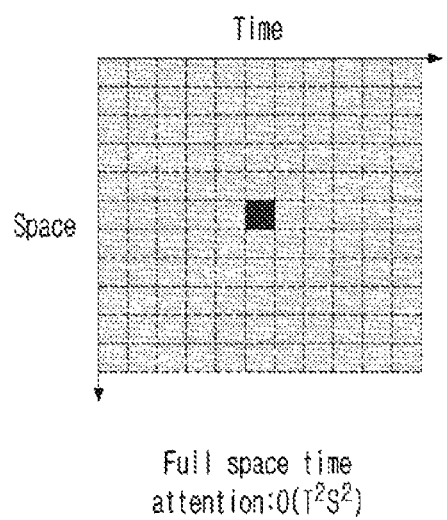
FIGS. 1A to 1C show existing space-time self-attention techniques for video recognition.

Broadly speaking, the present techniques generally relate to a method and apparatus for video recognition, and in particular relate to a computer-implemented method for performing video recognition using a transformer-based machine learning, ML, model. Put another way, the present techniques provide new methods of image processing in order to automatically extract feature information from a video.

This work develops a method for video recognition using transformers. As mentioned above, video recognition refers to the problem of recognizing events of interest in video sequences.

A transformer is a deep learning model that adopts the mechanism of attention, weighing the influence of different parts of the input data. Transformers are typically designed to handle sequential input data, such as natural language, for tasks such as translation and text summarisation. However, transformers do not require that the sequential data be processed in order. Rather, the attention operation of the model provides context for any position in the input sequence. The basic building blocks of a Transformer model are scaled dot-product attention units.

As mentioned above, transformers have been used successfully to process sequential data, such as text for natural language processing. Transformers have also been used for image recognition tasks, and have been shown to be more accurate than convolutional neural networks. As videos contain sequential data, it is desirable to use transformer-based models to perform video recognition tasks. A direct, natural extension of transformers from the spatial to spatio-temporal domain is to perform the self-attention simultaneously (i.e. jointly) across both spatial and temporal dimensions (self-attention is the main computational mechanism of transformers). However, even for single images, transformers tend to be memory- and, to some extent, computationally-constrained, making such models impractical even when compared with the 3D based convolutional models. Specifically, full space-time attention has complexity of $S^2 \times T^2$, i.e. quadratic in space and time. The present techniques aim to exploit the temporal information present in video streams while minimising the computational burden with the Transformer framework, thereby allowing for efficient video recognition on even computationally strained devices. The present techniques may be used as a replacement to known multi-headed space-time or divided space-time attention modules found in existing Transformer architectures. Thus, the present techniques may be used with all modern visual Transformer-based architectures.

The present techniques propose a transformer-based model for video recognition, the complexity of which scales linearly with the number of frames in the video sequence and hence induces no overhead compared to an image-based transformer model.

The present techniques achieve this by firstly, providing a video recognition model that makes two approximations to the full spatio-temporal attention used in video transformers:
1. It restricts time attention to a local temporal window and capitalizes on the transformer's depth to obtain full temporal coverage of the video sequence; and
2. It uses efficient space-time mixing to attend jointly spatial and temporal locations without inducing any extra cost of a spatial-only temporal model. As discussed in detail below, this may be achieved by temporal channel shifting.

Secondly, the present techniques achieve this model by integrating two very lightweight mechanisms for global temporal-only attention which provide additional accuracy improvements at minimal computational cost. Overall, the present applicants demonstrate that the model of the present techniques is surprisingly effective in terms of capturing long-term temporal dependencies and producing very high recognition accuracy on the most popular video recognition datasets including Kinetics-400 and Something-Something-v2, while at the same time being significantly more efficient than other transformer-based video recognition models.

Figure 1B:
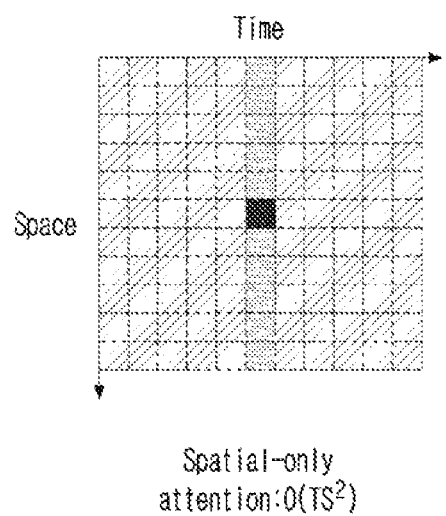
Figure 1C:
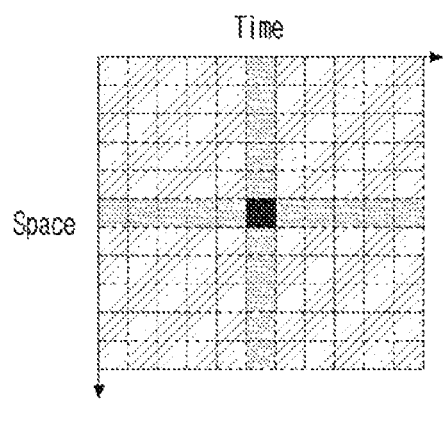
Figure 1D:
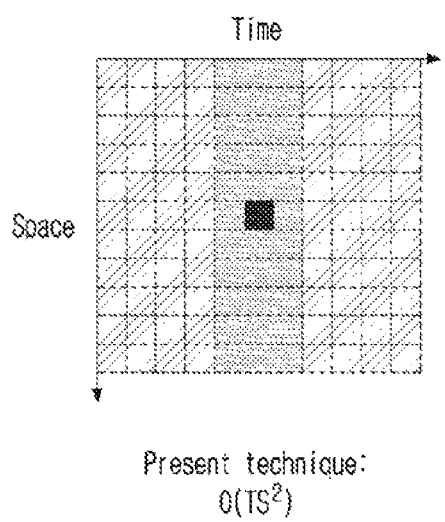
FIG. 1D shows the present technique for space-time self-attention for video recognition.

FIGS. 1A to 1C show existing space-time self-attention techniques for video recognition, while FIG. 1D shows the present technique for space-time self-attention for video recognition. In each case, the query vector for the attention process is located at the centre of the grid, and the key locations which are attended by the query vector are highlighted. The squares in the grid which are not highlighted are not attended by the central query vector. In FIG. 1A, full space-time attention is performed, which has a complexity of $S^2 \times T^2$, i.e. quadratic in space and time. In FIG. 1B, only spatial attention is performed, and therefore different positions in space are analysed at the same point in time. This has a complexity of $S^2 \times T$. In FIG. 1C, attention is performed at different points in time and space, which has a complexity of $ST^2 + S^2T$. In contrast, in the present techniques, the key vector is constructed by mixing information from patches (also known as tokens) of frames of a video that are located at the same spatial location within a local temporal window. Self-attention is then performed on these patches. The present techniques will now be described in detail.

Related work—video recognition. Standard solutions are based on CNNs and can be broadly classified into two categories: 2D- and 3D-based approaches. 2D-based approaches process each frame independently to extract frame-based features which are then aggregated temporally with some sort of temporal modeling (e.g. temporal averaging) performed at the end of the network. 3D-based approaches are considered the current state-of-the-art as they can typically learn stronger temporal models via 3D convolutions. However, they also incur higher computational and memory costs. To alleviate this, a large body of works attempt to improve their efficiency via spatial and/or temporal factorization.

Related work—CNN vs ViT. Historically, video recognition approaches tend to mimic the architectures used for image classification (e.g. from AlexNet or from ResNet and ResNeXt). After revolutionizing natural language processing, very recently, Transformer-based architectures showed promising results on large scale image classification too. While self-attention and attention were previously used in conjunction with CNNs at a layer or block level, the Vision Transformer (ViT) of Dosovitskiy et al. (Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020) is the first convolution-free, Transformer-based architecture that achieves state-of-the-art on ImageNet (Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pages 248-255. Ieee, 2009).

Related work—video transformer. Recently, vision transformer architectures, derived from Dosovitskiy et al. were used for video recognition too. Since performing full space-time attention is computationally prohibitive (i.e. $O(T^2 S^2)$), their main focus is on reducing this via temporal and spatial factorization. In TimeSformer (Gedas Bertasius, Heng Wang, and Lorenzo Torresani. Is space-time attention all you need for video understanding? arXiv preprint arXiv:2102.05095, 2021), the authors propose applying spatial and temporal attention in an alternating manner reducing the complexity to $O(T\ 2S+T\ S2)$. In a similar fashion, ViViT (Anurag Arnab, Mostafa Dehghani, Georg Heigold, Chen Sun, Mario Luˇ ciˇ c, and Cordelia Schmid. Vivit: A video vision transformer. arXiv preprint arXiv:2103.15691, 2021) explores several avenues for space-time factorization. In addition, they also proposed to adapt the patch embedding process from Dosovitskiy et al. to 3D (i.e. video) data. The present techniques proposes a completely different approximation to full space-time attention that is also efficient. To this end, the present techniques firstly restrict full space-time attention to a local temporal window, and secondly, define a local joint space-time attention and show that this can be implemented efficiently via the "shift trick" (Bichen Wu, Alvin Wan, Xiangyu Yue, Peter Jin, Sicheng Zhao, Noah Golmant, Amir Gholaminejad, Joseph Gonzalez, and Kurt Keutzer. Shift: A zero flop, zero parameter alternative to spatial convolutions. In CVPR, 2018).

Video Transformer. A video clip $X \in \mathbb{R}^{T \times H \times W \times C}$ is received, where T is time information (e.g. number of frames), H and W are spatial dimensions such that S=HW, and C indicates the number of channels (also sometimes termed views) included with the video clip. For the examples described herein C=3, as may be the case when the video is an RGB colour video, but it will be understood that video clip may have any number of channels. Each frame of the video is divided into K×K patches, which are then mapped into visual tokens i using a linear embedding layer $E \in \mathbb{R}^{K^2 \times d}$. Since self-attenuation is permutation invariant it is helpful to preserve the information regarding the location of each patch in space and time, which involves two positional embeddings: $P_S \in \mathbb{R}^{1 \times S \times s \times d}$ for space and $P_t \in \mathbb{R}^{T \times 1 \times d}$ for time. These are added to the initial visual tokens.

The token sequence is processed by L Transformer layers. The visual token at layer l, spatial location s and temporal location t is denoted as:

$$z_{s,t}^l \in \mathbb{R}^d, l=0, \ldots, L-1, s=0, \ldots, N-1, t=0, \ldots, T-1. \quad (1)$$

In addition to the T S visual tokens extracted from the video, a special classification token $z_{cls}^l \in \mathbb{R}^d$ is prepended to the token sequence. The l-th Transformer layer processes the visual tokens $Z^l \in \mathbb{R}^{NT \times d}$ (also written $Z^l \in \mathbb{R}^{(TS+1)}$) of the previous layer using a series of Multi-head Self-Attention (MSA), Layer Normalization (LN), and MLP ($\mathbb{R}^d \to \mathbb{R}^{4d} \to \mathbb{R}^d$) layers as follows:

$$Y^l = MSA(LN(Z^{l-1})) + Z^{l-1}, \quad (2)$$

$$Z^{l+1} = MLP(LN(Y^l)) + Y^l. \quad (3)$$

The main computation of a single full space-time Self-Attention (SA) head boils down to calculating:

$$y_{s,t}^l = \sum_{t'=0}^{T-1} \sum_{s'=0}^{S-1} \text{Softmax}\left\{\frac{q_{s,t}^l \cdot k_{s',t'}^l}{\sqrt{d_h}}\right\} v_{s',t'}^l, \begin{cases} s=0,\ldots,S-1 \\ t=0,\ldots,T-1 \end{cases} \quad (4)$$

where $q_{s,t}^l$, $k_{s,t}^l$, $v_{s,t}^l \in \mathbb{R}^{d_h}$ are the query, key, and value vectors computed from $z_{s,t}^l$ using embedding matrices $W_q$, $W_k$, $W_v \in \mathbb{R}^{d \times d_h}$. Finally, the output of h heads are concatenated and projected using embedding matrix $W_h \in \mathbb{R}^{hd_h \times d}$.

Thus the complexity of a full space-time Transformer model is $O(3hTSdd_h)$ (qkv projections)+$O(2hT^2S^2d_h)$ (MSA for h attention heads)+$O(TS(hd_h)d)$ (multi-head projections)+$O(4TSd^2)$ (MLP). From these terms the goal of the present techniques is to reduce the cost of $O(2T^2S^2d_h)$ (for a single attention head) as this is the dominant term of the full space-time attention. Moving forward the constant terms and $d_h$ will be dropped such that the complexity is approximated by simply $O(T^2S^2)$ for the full space-time model (and variations of for other models).

Baseline Transformer model. The first step in reducing complexity is to approximate the full space-time attention by applying, at each Transform layer, spatial-only attention:

$$y_{s,t}^l = \sum_{s'=0}^{S-1} \text{Softmax}\left\{\frac{q_{s,t}^l \cdot k_{s',t}^l}{\sqrt{d_h}}\right\} v_{s',t}^l, \begin{cases} s=0,\ldots,S-1 \\ t=0,\ldots,T-1 \end{cases}. \quad (5)$$

The complexity of such a model is $O(TS^2)$. Notably, the complexity of the proposed space-time mixing attention is also $O(TS^2)$. Following spatial-only attention, simple temporal averaging may be performed on the class token $$z_{final} = \frac{1}{T} \sum_t z_{t,cls}^{L-1}$$

to obtain a single feature which is then fed into a linear classifier to provide a prediction result.

Factorisation approach. One way to reduce the $O(T^2S^2)$ cost of the full space-time attention of Eq. 4 is to factorise the attention:

$$\tilde{y}_{s,t}^l = \sum_{t'=0}^{T-1} \text{Softmax}\{(q_{s,t}^l \cdot k_{s,t'}^l)/\sqrt{d_h}\} v_{s,t'}^l, y_{s,t}^l = \sum_{s'=0}^{N-1} \text{Softmax}\{(\tilde{q}_{s,t}^l \cdot \tilde{k}_{s',t}^l)/\sqrt{d_h}\} \tilde{v}_{s',t}^l, \quad (6)$$

where $\tilde{q}_{s,t}^l$, $\tilde{k}_{s,t}^l$, $\tilde{v}_{s,t}^l$ are new query, key and value vectors calculated from $\tilde{y}_{s,t}^l$. (More precisely, Eq. 6 holds for h=1 heads. For h>1, the different heads $\tilde{y}_{s,t}^{l,h}$ are concatenated and projected to produce $\tilde{y}_{s,t}^l$.) The above model reduces complexity to $O(T^2S+TS^2)$. However, temporal attention is performed for a fixed spatial location which is ineffective when there is camera or object motion and there is spatial misalignment between frames.

The cost of the factorisation approach may be further reduced by the following approximation: $L_s$ Transformer layers perform spatial-only attention as in Eq. 6. For the $l_s$-th layer, the spatial-only self-attention is given by:

$$y_{s,t}^{l_s} = \sum_{s'=0}^{N-1} \text{Softmax}\{(q_{s,t}^{l_s} \cdot k_{s',t}^{l_s})/\sqrt{d_h}\} v_{s',t}^{l_s} \quad (7)$$

Following $L_s$ spatial layers, a single feature $z_t^{L_s}$ per frame is calculated through the dedicated per frame class token or by spatial averaging, for example, $z_t^{L_s} \sum_{s=0}^{N-1} z_{s,t}^{L_s}$. Then, $L_t$ Transformer layers perform temporal-only attention. For the $l_t$-th layer, this is given by:

$$y_{s,t}^{l_s} = \sum_{t'=0}^{T-1} \text{Softmax}\{(q_{s,t}^{l_t} \cdot k_{t'}^{l_t})/\sqrt{d_h}\} v_{t'}^{l_t}. \quad (8)$$

The above model reduces complexity to $O(S^2+T^2)$. However, it performs spatial-only and temporal-only attention in a sequential manner.

Improved Video Transformer Model. The model of the present techniques aims to better approximate the full space-time attention (SA) of Eq. 4 while keeping complexity to $O(TS^2)$, i.e. inducing no further complexity to a spatial-only model.

A first approximation is made to perform full-space time attention but restricted to a local temporal window $[-t_w, t_w]$:

$$y_{s,t}^l = \sum_{t'=t-t_w}^{t+t_w} \sum_{s'=0}^{N-1} \text{Softmax}\{(q_{s,t}^l \cdot k_{s',t'}^l)/\sqrt{d_h}\} v_{s',t'}^l \sum_{t'=t-t_w}^{t+t_w} v_{t'}^l, a_{t'}^l, \quad (9)$$

where $V_{t'}^l = [v_{0,t'}^l; \ldots; v_{N-1,t'}^l] \in \mathbb{R}^{d_h \times S}$ and $a_{t'}^l = [a_{0,t'}^l = a_{1,t'}^l, \ldots, a_{S-1,t'}^l] \in \mathbb{R}^S$ is the vector with the corresponding attention weights. Eq. 9 shows that, for a single Transformer layer, $y_{s,t}^l$ is a spatio-temporal combination of the visual tokens in the local window $[-t_w, t_w]$. It follows that, after k Transformer layers, $y_{s,t}^{l+k}$ will be a spatio-temporal combination of the visual tokens in the local window $[-kt_w, kt_w]$ which in turn conveniently allows to perform spatio-temporal attention over the whole clip. For example, for $t_w=1$ and k=4, the local window becomes $[-4,4]$ which spans the whole video clip for the typical case T=8.

Thus, to summarise, the present techniques provide a method for performing video recognition using a transformer-based machine learning, ML, model, the method comprising: receiving a video comprising a plurality of frames, the video depicting at least one feature to be identified; defining a temporal window comprising at least three frames from the received video; and performing a single spatial attention, using the transformer-based ML model, over the frames in the temporal window to identify at least one feature.

The complexity of the local self-attention of Eq. 9 is $O(T(2t_w+1)^2S^2)$. To reduce this even further, a second approximation is made on top of the first one as follows: the attention between spatial locations s and s' according to the model of Eq. 9 is:

$$\sum_{t'=t-t_w}^{t+t_w} \text{Softmax}\{(q_{s,t}^l \cdot k_{s',t'}^l)/\sqrt{d_h}\} v_{s',t'}^l = a_{(s,s')}^l v_{s',t'}^l, \quad (9)$$

i.e. it requires the calculation of $2t_w+1$ attentions, one per temporal location over $[-t_w, t_w]$. Instead, we propose to calculate a single attention over $[-t_w, t_w]$ which can be achieved by $q_{s,t}^l$ attending $k_{s',-t_w:t_w}^l \triangleq [k_{s',t-t_w}^l; \ldots; k_{s',t+t_w}^l] \in \mathbb{R}^{(2t_w+1)d_h}$.

Note that to match the dimensions of $q_{s,t}^l$ and $k_{s',-t_w}^l$ a further projection of $k_{s',t-t+t_w}^l$ to $\mathbb{R}^{d_h}$ is normally required which has complexity $O((2t_w+1)d_h^2)$ and hence compromises the goal of an efficient implementation. To alleviate this, a "shift trick" is used which allows to perform both zero-cost dimensionality reduction, space-time mixing and attention (between $q_{s,t}^l$ and $k_{s',-t_w:t_w}^l$) in $O(d_h)$. In particular, each $t' \in [-t_w, t_w]$ is assigned $d_h^{t'}$ channels from $d_h$ (i.e. $\Sigma_{t'} d_h^{t'} = d_h$). Let $k_{s',t'}^l) \in \mathbb{R}^{d_h}$ denote the operator for indexing the $d_h^{t'}$ channels from $k_{s',t'}^l$. Then construct a new key vector as:

$$\tilde{k}_{s',-t_w:t_w}^l \triangleq [k_{s',t-t_w}^l(d_h^{t-t_w}), \ldots, k_{s',t+t_w}^l(d_h^{t+t_w})] \in \mathbb{R}^{d_h}. \quad (10)$$

Thus, defining a temporal window may further comprise: shifting a predefined number of channels of each patch to another patch in the temporal window, such that each patch contains channels from different times. Advantageously, space-time mixing is used to attend, jointly, spatial and temporal locations without inducing any additional cost on top of the spatial-only attention model. Shifting means that for each patch at time t, some of the channels of that patch will be sourced from the same patch (i.e. the same position within another frame in the temporal window) at a different point in time. This means that the patches are temporally-mixed, which in turn means that only spatial attention needs to be performed. Advantageously, this reduces the complexity of the spatio-temporal attention from quadratic in both the spatial and temporal terms to linear in the temporal term. The mixing technique simultaneously prevents performance degradation and increases robustness. Channel shifting has the advantage of reducing the dimensionality of the output from the Transformer model, thereby providing further efficiency gains for devices running the present techniques.

Figure 2A:
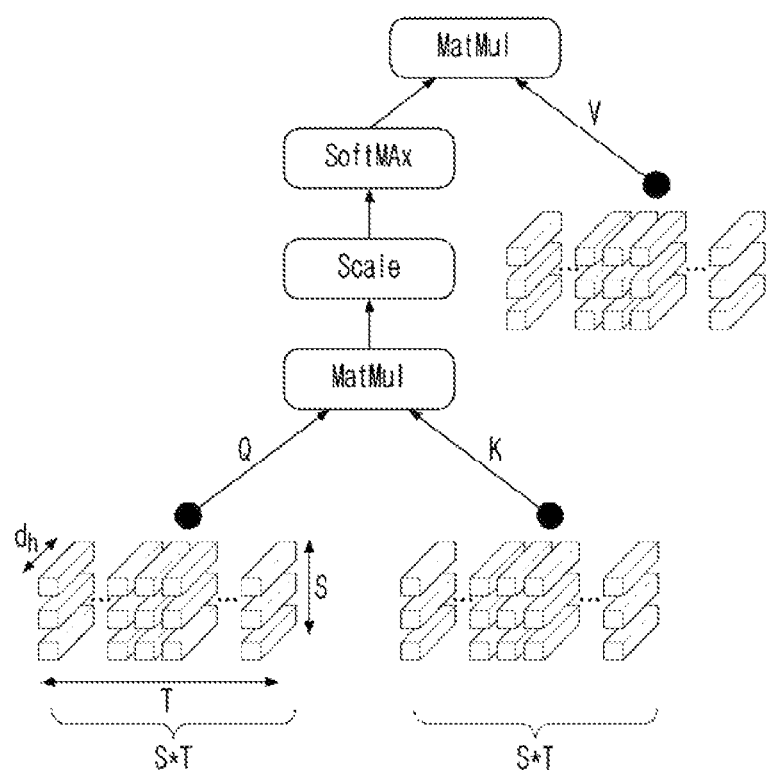
FIG. 2A shows an existing computation technique for space-time self-attention.
Figure 2B:
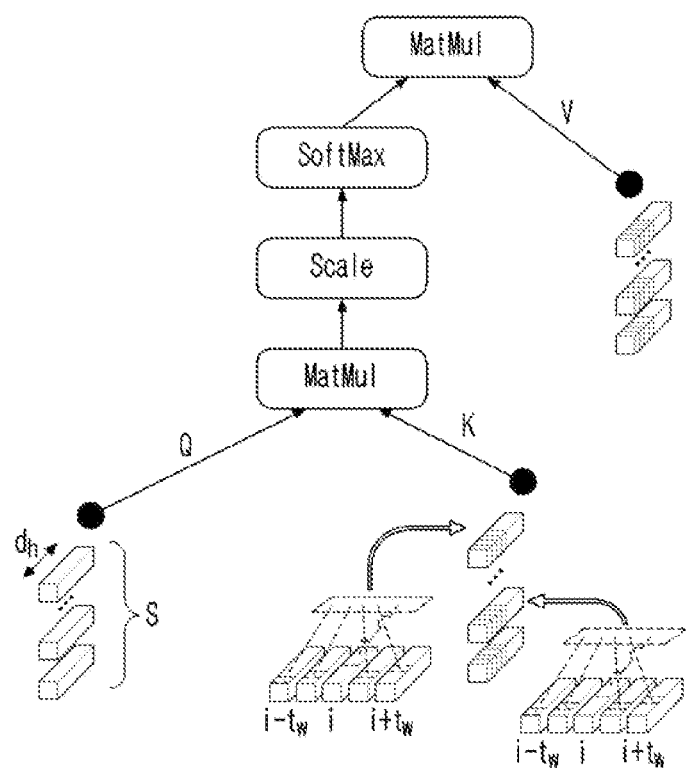
FIG. 2B shows the present technique for space-time mixing self-attention.

FIG. 2A shows an existing computation technique for space-time self-attention, and FIG. 2B shows the present technique for space-time mixing self-attention. As shown in FIG. 2A, existing techniques for full space-time attention have complexity of $S^2 \times T^2$, i.e. quadratic in space and time. In contrast, FIG. 2B shows that in the present techniques, only S tokens (i.e. patches) participate instead of ST. The temporal information is aggregated by indexing (i.e. shifting) channels from adjacent frames/patches. In FIG. 2B, tokens of identical colour/shading share the same temporal index.

More specifically, in FIG. 2B, MatMul denotes a batched matrix multiplication operation, Softmax the softmax function, Scale a scalar-matrix multiplication, and the arrows the direction of the information flow during inference. Each parallelepiped of shape 1×C denotes a given token at time t and location i. Parallelepipeds of same color/shading are sourced at the same time location (i.e. frame) t. Thus the tokens for K and V are constructed by sampling channels (i.e. mixing) from the adjacent tokens located at the same spatial location i but different time locations t. The size of this window corresponds with the local temporal window size (i.e. $[-t_w, t_w]$), while the channels mixing approximates the local attention in 1 step instead of T steps, thereby reducing the complexity with respect to time. The output of FIG. 2B is processed feature tensors in the same shape as the input, which can then be passed on to a linear classifier (or other type of classifier, as appropriate).

It can also be visually appreciated that the query vector Q encodes only spatial information while the present model encodes temporal information only through approximation of the local temporal window in the key vector; by contrast the full spatio-temporal model (FIG. 2A) has both the query vector and key vector encode both S and T information.

Moreover, a new value vector $\tilde{v}_{s',-t_w:t_w}^l$ can be constructed in a similar way. Formerly, then, the approximation given to space-time attention by the present model is:

$$y_{s,t}^l = \sum_{s'=0}^{S-1} \text{Softmax} \left\{ \frac{q_{s,t}^{l_s} \cdot \tilde{k}_{s',-t_w:t_w}^l}{\sqrt{d_h}} \right\} \tilde{v}_{s',-t_w:t_w}^l \begin{cases} s = 0, \ldots, S-1 \\ t = 0, \ldots, T-1 \end{cases}. \quad (11)$$

Thus the present model has the complexity of a spatial-only video-transformer and hence it is more efficient than previously proposed video transformers. The model of the present techniques also provides a better approximation to the full space-time attention, and as shown by the results below it significantly outperforms existing techniques.

Temporal Attention Aggregation. The final set of the class tokens $z_{t,cls}^{L-1}$, $0 \leq t \leq L-1$ are used to generate the predictions, for which there are the following options:

(a) simple temporal averaging $$z_{final} = \frac{1}{T} \sum_t z_{t,cls}^{L-1}$$

as in the case of the baseline model.

However a limitation of temporal averaging is that the output is treated purely as an ensemble of per-frame features and, hence, completely ignores the temporal ordering between them.

(b) To address the limitations of (a), one option is to use a lightweight Temporal Attention (TA) mechanism that will attend the T classification tokens. Here a $z_{final}$ token attends the sequence $[z_{t,cls}^{L-1}, \ldots, z_{T-1,cls}^{L-1}]$ using a temporal Transformer layer which is then fed as input to the classifier.

Summary Token. As an alternative to TA, there is also option (c) which provides a lightweight mechanism for information exchange between different frames at intermediate layers of the network. Given the set of tokens for each frame t, $Z_t^{l-1} \in \mathbb{R}^{(s+1) \times d_h}$ (constructed by concatenating all tokens $z_{s,t}^{l-1}$, s=0, . . . , S), we compute a new set of R tokens $z_{r,t}^l = \emptyset(Z_t^{l-1}) \in \mathbb{R}^{R \times d_h}$ which summarize the frame information and hence are named "Summary" tokens. These are then appended to the visual tokens of all frames to calculate the keys and values so that the query vectors attend the original keys plus the Summary tokens. Herein, we explore the case that $\emptyset(\cdot)$ performs simple spatial averaging $$z_{0,t}^l = \frac{1}{S} \Sigma_s z_{s,t}^l$$

over the tokens of each frame (R=1 for this case). Note that, for R=1, the extra cost that the Summary token induces is O(T S).

Figure 3:
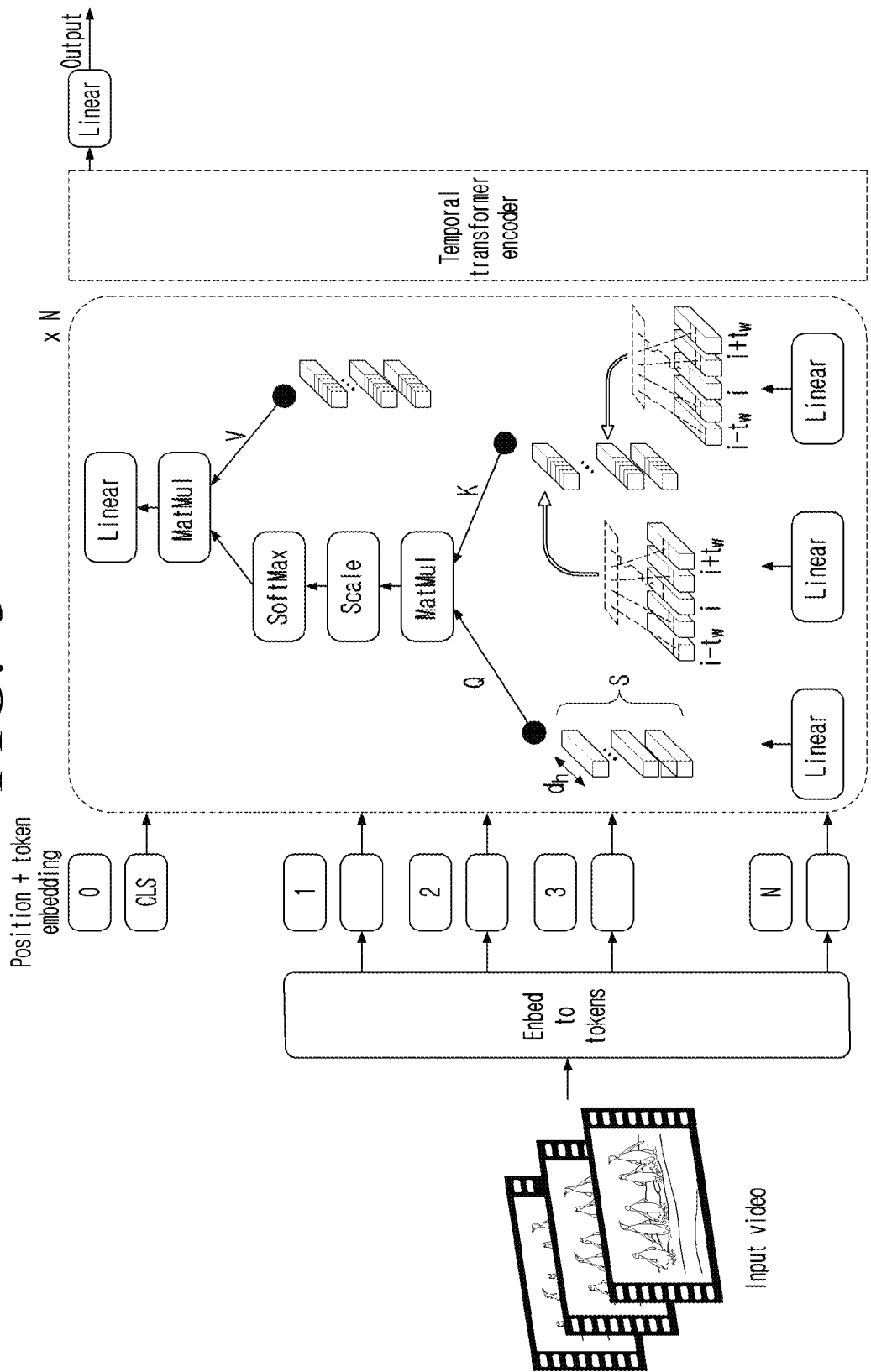
FIG. 3 shows an example network architecture for producing video recognition predictions using the present techniques.

Prediction Architecture. FIG. 3 shows how an example network can be created by stacking a number of space-time mixing attention modules (operating substantially as described above) over one another. The input is a set of sparsely sampled frames form a given sequence; the output is the prediction (i.e. what is recognized within the video clip).

The network is prepended by an embed to tokens module that extracts patches from the sparsely sampled frames (i.e. tokens) and linearly projects them to 1×C. Since attention modules are permutations invariant, a temporal encoding is injected into the tokens. Finally, the modules produce a set of tokens that are fed into one temporal attention layer that produces a final representation that is used to produce the final output using a linear classifier.

Experimental Setup: Datasets. The proposed models are trained and evaluated on the following datasets:

Kinetics-400 and 600: The Kinetics dataset consists of short clips (typically 10 sec long sampled from YouTube) labeled using 400 and 600 classes, respectively. Due to the removal of some videos from YouTube, the version of the dataset used for the experiments consists of approximately 261K clips for Kinetics-400. (Kinetics-400 and 600: Gill Kay, Joao Carreira, Karen Simonyan, Brian Zhang, Chloe Hillier, Sudheendra Vijayanarasimhan, Fabio Viola, Tim Green, Trevor Back, Paul Natsev, et al. The kinetics human action video dataset. arXiv preprint arXiv:1705.06950, 2017).

Something-Something-v2 (SSv2): The SSv2 [17] dataset consists of 220,487 short videos (of duration between 2 and 6 sec) that depict humans performing pre-defined basic actions with everyday objects. Since the objects and backgrounds in the videos are consistent across different action classes, this dataset tends to require stronger temporal modeling. Due to this, most of the ablation studies are conducted on SSv2 to better analyze the importance of the proposed components. (SSv2: Raghav Goyal, Sam ira Ebrahimi Kahou, Vincent Michalski, Joanna Materzynska, Susanne Westphal, Heuna Kim, Valentin Haenel, Ingo Fruend, Peter Yianilos, Moritz Mueller-Freitag, et al. The "something something" video database for learning and evaluating visual common sense. In Proceedings of the IEEE International Conference on Computer Vision, pages 5842-5850, 2017)

Epic Kitchens-100 (Epic-100): is an egocentric large scale action recognition dataset consisting of more than 90,000 action segments spanning 100 hours of recordings in home environments, capturing daily activities. The dataset is labeled using 97 verb classes and 300 noun classes. The evaluation results are reported using the standard action recognition protocol: the network predicts the "verb" and the "noun" using two heads. The predictions are then merged to construct an "action" which is used to report the accuracy (Epic-100: Dima Damen, Hazel Doughty, Giovanni Maria Farinella, Antonino Furnari, Evangelos Kazakos, Jian Ma, Davide Moltisanti, Jonathan Munro, Toby Perrett, Will Price, et al. Rescaling egocentric vision. arXiv preprint arXiv:2006.13256, 2020).

Experimental Setup: Training details. All the models presented thought this document, unless otherwise stated are trained using the same scheduler and training procedure. Specifically, the models of the present techniques are trained using SGD with momentum (0.9) and a cosine scheduler with linear warmup for 35 epochs. The base learning rate, set at a batch size of 128, is 0.05. To prevent over-fitting, the following augmentation techniques are used: random scaling (0.9× to 1.3×) and cropping, random flipping (with probability of 0.5), autoaugment, random erasing (probability=0.5, min. area=0.02, max. area=⅓, min. aspect=0.3) and label smoothing ($\lambda$=0.3).

The backbone models closely follow the ViT architecture of Dosovitskiy et al. Most of the experiments are performed using the ViT-B/16 variant (L=12, h=12, d=768, K=16), where L represent the number of transformer layers, h the number of heads, d the embedding dimension and K the patch size (i.e. 16×16). The models are initialised from a pretrained ImageNet-21k ViT model. The models were trained on 8 V100 GPUs using PyTorch.

Experimental Results. This section details the accuracy (%) achieved by the models of the present techniques (the higher the better) and the computational cost in terms of FLOPS (the lower the better). The models are compared against the recently proposed video transformers by FaceBook (Gedas Bertasius, Heng Wang, and Lorenzo Torresani, "Is space-time attention all you need for video understanding?", arXiv preprint arXiv:2102.05095, 2021) and Google (Anurag Arnab, Mostafa Dehghani, Georg Heigold, Chen Sun, Mario Lucic, and Cordelia Schmid, "Vivit: A video vision transformer", arXiv preprint arXiv:2103.15691, 2021). Results on the two most widely used video recognition benchmarks are presented, i.e. Kinetics-400 and Something-Something v2.

Unless otherwise stated, the model was tested used ViT-B/16 and T=8 frames. Temporal Attention (TA) was used for temporal aggregation. Results are given for 1×3 views (1 temporal clip and 3 spatial crops) departing from the common approach of using up to 10×3 views. To measure the variation between runs, we trained one of the 8-frame models 5 times. The results varied by +0.4%.

Ablation studies. The following details the effects of altering various design parameters of the present techniques.

Table 1 shows the effect of local window size on the accuracy of the model. As can be seen, the present model is significantly superior to the baseline (tw=0) which uses spatial-only attention. Also, a window of tw=1 produces the most accurate results, which shows that that more gradual increase of the effective window size that is attended is more beneficial compared to more aggressive ones, i.e. the case where tw=2. Notably, a performance degradation for the case tw=2 could be attributed to boundary effects which are aggravated as tw increases; that is, how the model handles attempting to take the local window before/beyond the first/final frame in a clip (which generally handled by filling with zeros). Accordingly the following results (and the general discussion herein) focusses on the model utilising tw=1.

TABLE 1

| Variant | Top-1 | Top-5 |
| --- | --- | --- |
| $t_w = 0$ | 45.2 | 71.4 |
| $t_w = 1$ | 62.5 | 87.8 |
| $t_w = 2$ | 60.5 | 86.4 |
| $t_w = 2$ (Bo.) | 60.4 | 86.2 |

Table 2 shows the effects of varying which layers of the machine learning model the space-time mixing attention operation is applied to within the transformer. In particular, the effect of applying the attention to the first L/2 layers, to the last L/2 layers, to every odd indexed layer and finally, to all layers. As the results from Table 2a show, the exact layers within the network that self-attention is applied to do not matter; what matters is the number of layers it is applied to. This is attributed to the increased temporal receptive field and cross-frame interactions.

TABLE 2

| (a) Effect of applying the proposed SA to certain layers. | | |
| --- | --- | --- |
| Transform. layers | Top-1 | Top-5 |
| 1st half | 61.7 | 86.5 |
| 2nd half | 61.6 | 86.3 |

TABLE 2-continued

| | | |
|---|---|---|
| Half (odd. pos) | 61.2 | 86.4 |
| All | 62.6 | 87.8 |

(b) Effect of number of TA layers.

| #. TA layers | Top-1 | Top-5 |
|---|---|---|
| 0 (temp. avg.) | 62.4 | 87.8 |
| 1 | 64.4 | 89.3 |
| 2 | 64.5 | 89.3 |
| 3 | 64.5 | 89.3 |

0 corresponds to temporal averaging.

(c) Effect of space-time mixing.

| x | key | value | Top-1 | Top-5 |
|---|---|---|---|---|
| X | X | X | 56.6 | 83.5 |
| ✓ | X | X | 63.1 | 88.8 |
| X | ✓ | X | 63.1 | 88.8 |
| X | X | ✓ | 62.5 | 88.6 |
| X | ✓ | ✓ | 64.4 | 89.3 |

X denotes the input token before qkv projection. Query produces equivalent results with key and thus omitted.

(d) Effect of amount of mixed channels.

| 0%* | 0% | 25% | 50% | 100% |
|---|---|---|---|---|
| 45.2 | 56.6 | 64.3 | 64.4 | 62.5 |

*uses temp. avg. aggregation.

It is also possible to compare the compare the prior art method for temporal aggregation, simple temporal averaging, with the present Temporal Attention (TA) mechanism. Given that the present model already incorporates temporal information through the proposed space-time attention, it is useful to also explore how many TA layers are needed. As shown in Table 2b replacing temporal averaging with one TA layer improves the Top-1 accuracy from 62.5% to 64.4%. Increasing the number of layers further yields no additional benefits. In the absence of the proposed space-time mixing attention, the TA layer alone is unable to compensate, scoring only 56.6% as shown in Table 2d. This highlights the benefit of including both temporal and spatial components in the present model. Accordingly, the present techniques focus on the case of a single TA layer.

Focusing on Eq. 11, the key vector and value vector may be implemented by efficient channel indexing (Eq. 10). Space-time mixing can however be applied in several different ways in the model. Table 2c shows the effect of space-time mixing to various combinations for the key, value and to the input token prior to qkv projection. As can be seen, the combination corresponding to the model primarily discussed herein (i.e. space-time mixing applied to the key and value) significantly outperforms all other variants by up to 2%. This then confirms that the present model gives the best results when compared to other non-well motivated variants.

It is also possible to study $\rho d_h$, the total the total number of channels imported from the adjacent frames in the local temporal window when constructing the new key vector. As shown by Table 2d, the optimal is between 25% and 50%. Increasing to 100% (i.e. all channels are coming from adjacent frames) unsurprisingly degrades the performance as it excludes the case t'=t when performing the self-attention.

Table 3 compares Temporal Attention with Summary token on SSv2 and Kinetics-400. Both datasets are tested as they require different type of understanding: fine-grained temporal (SSv2) and spatial content (K400). It can be seen that the Summary token compares favourably on Kinetics-400 but not on SSv2, showing that is more useful in terms of capturing spatial information. Since the improvement is small, it can be concluded that 1 TA layer is the optimal global attention-based mechanism for improving the accuracy of the present method adding also negligible computational cost.

TABLE 3

| Summary | TA | Top-1 | Top-5 |
|---|---|---|---|
| X | X | 62.4 | 87.8 |
| ✓ | X | 63.7 | 88.9 |
| ✓ | ✓ | 63.4 | 88.9 |
| X | ✓ | 64.4 | 89.3 |
| X | X | 77.8 | 93.7 |
| ✓ | X | 78.7 | 93.7 |
| ✓ | ✓ | 78.0 | 93.2 |
| X | ✓ | 78.5 | 93.7 |

The result of varying the number of input tokens by changing patch size K is shown in Table 4 (specifically as tested on SSv2). It can be seen that as the number of tokens decreases the presently described model still produces models which achieve satisfactory accuracy. This is beneficial because fewer tokens improves overall efficiency.

TABLE 4

| Variant | Top-1 | Top-5 | FLOPs ($\times 10^9$) |
|---|---|---|---|
| ViT-B/32 | 60.5 | 87.4 | 95 |
| ViT-L/32 | 61.8 | 88.3 | 327 |
| ViT-B/16 | 64.4 | 89.3 | 425 |

Figure 4:
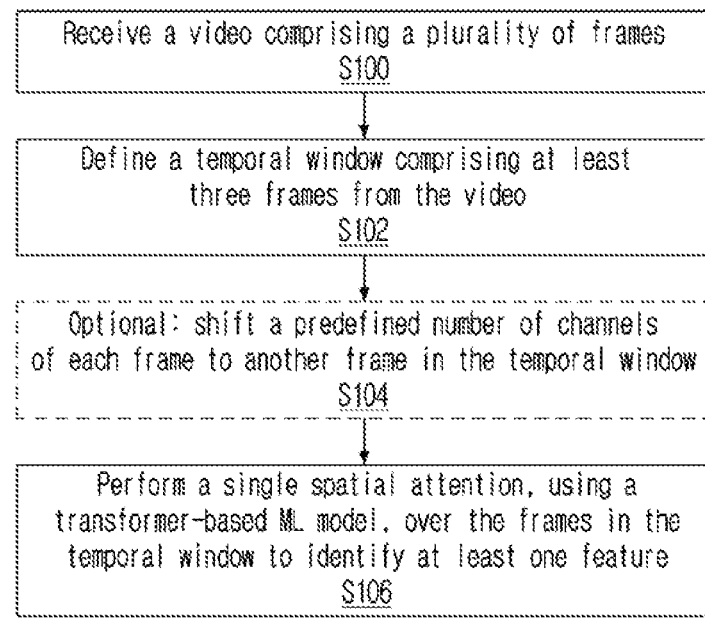
FIG. 4 shows a flowchart of example steps for performing video recognition using a transformer-based ML model.

The present techniques have been described and reported using 1 temporal and 3 spatial crops (i.e., 1×3). This is noticeable different from the current practice of using up to 10×3 crops. FIG. 4 shows the behaviour of our the present method (labelled X-ViT in the figure) when increasing the number of crops on Kinetics-400. As can be seen, increasing the number of crops beyond two temporal views (i.e. 2×3), yields no additional gains.

While the channel shifting operation used by the proposed space-time mixing attention is zero-FLOP, there is still a small cost associated with memory movement operations. In order to ascertain that the induced cost does not introduce noticeable performance degradation, spatial-only attention and proposed model (8× frames) were benchmarked on 8 V100 GPUs and a batch size of 128. The spatial-only attention model yielded a throughput of 312 frames/second while our model 304 frames/second.

Comparison to state of the art. In the following the present techniques were tested using space-time mixing attention in all the Transformer layers and performing temporal aggregation using a single lightweight temporal transformer layer as described above.

TABLE 5

| Method | Top-1 | Top-5 | Views | FLOPs (×10$^9$) |
| --- | --- | --- | --- | --- |
| bLVNet | 73.5 | 91.2 | 3 × 3 | 840 |
| STM | 73.7 | 91.6 | — | — |
| TEA | 76.1 | 92.5 | 10 × 3 | 2,100 |
| TSM R50 | 74.7 | — | 10 × 3 | 650 |
| I3D NL | 77.7 | 93.3 | 10 × 3 | 10,800 |
| CorrNet-101 | 79.2 | — | 10 × 3 | 6,700 |
| ip-CSN-152 | 79.2 | 93.8 | 10 × 3 | 3,270 |
| LGD-3D R101 | 79.4 | 94.4 | — | — |
| SlowFast 8 × 8 R101 + NL | 78.7 | 93.5 | 10 × 3 | 3,480 |
| SlowFast 16 × 8 R101 + NL | 79.8 | 93.9 | 10 × 3 | 7,020 |
| X3D-XXL | 80.4 | 94.6 | 10 × 3 | 5,823 |
| TimeSformer-L | 80.7 | 94.7 | 1 × 3 | 7,140 |
| ViViT-L/16 × 2 | 80.6 | 94.7 | 4 × 3 | 17,352 |
| X-ViT (8×) (Ours) | 78.5 | 93.7 | 1 × 3 | 425 |
| X-ViT (16×) (Ours) | 80.2 | 94.7 | 1 × 3 | 850 |

TABLE 6

| Method | Top-1 | Top-5 | Views | FLOPs (×10$^9$) |
| --- | --- | --- | --- | --- |
| TRN | 48.8 | 77.6 | — | — |
| SlowFast + multigrid | 61.7 | — | 1 × 3 | — |
| TimeSformer-L | 62.4 | — | 1 × 3 | 7,140 |
| TSM R50 | 63.3 | 88.5 | 2 × 3 | — |
| STM | 64.2 | 89.8 | — | — |
| MSNet | 64.7 | 89.4 | — | — |
| TEA | 65.1 | — | — | — |
| ViViT-L/16 × 2 | 65.4 | 89.8 | 4 × 3 | 11,892 |
| X-ViT (8×) (Ours) | 64.4 | 89.3 | 1 × 3 | 425 |
| X-ViT (16×) (Ours) | 66.2 | 90.6 | 1 × 3 | 850 |
| X-ViT* (16×) (Ours) | 67.2 | 90.8 | 1 × 3 | 850 |
| X-ViT (32×) (Ours) | 66.4 | 90.7 | 1 × 3 | 1,270 |

TABLE 7

| Method | Top-1 | Top-5 | Views | FLOPs (×10$^9$) |
| --- | --- | --- | --- | --- |
| AttentionNAS | 79.8 | 94.4 | — | 1,034 |
| LGD-3D R101 | 81.5 | 95.6 | 10 × 3 | — |
| SlowFast R101 + NL | 81.8 | 95.1 | 10 × 3 | 3,480 |
| X3D-XL | 81.9 | 95.5 | 10 × 3 | 1,452 |
| TimeSformer-HR | 82.4 | 96.0 | 1 × 3 | 5,110 |
| ViViT-L/16x2 | 82.5 | 95.6 | 4 × 3 | 17,352 |
| X-ViT (8×) (Ours) | 82.5 | 95.4 | 1 × 3 | 425 |
| X-ViT (16×) (Ours) | 84.5 | 96.3 | 1 × 3 | 850 |

Table 5 shows Video Recognition accuracy (Top-1/Top-5) and Flops on Kinetics-400. Table 6 shows the same on SSv2. Table 7 shows the same on Kinetics-600.

On Kinetics-400, the present techniques match the current state-of-the-art results while being significantly faster than the next two best recently/concurrently proposed methods that also use Transformer-based architectures: 20× faster than ViVit and 8× than TimeSformer-L. Both of these models and the present space-time mixer model were initialized from a ViT model pretrained on ImageNet-21k and take as input frames at a resolution of 224×224px. Similarly, the results from Kinetics-600 show that the present techniques set the new standard for the state of the art moving forward.

On SSv2 the present techniques match and surpass the current state-of-the-art, especially in terms of Top-5 accuracy (ours: 90.8% vs ViViT: 89.8%) using models that are 14×(16 frames) and 9× (32 frames) faster.

Interestingly, Tables 5-7 can be used to evaluate the impact of increasing the number of input frames T from 8 to 16 and 32. We note that, for our method, this change results in a linear increase in complexity. As the results from Table 6 show, increasing the number of frames from 8 to 16 offers a 1.8% boost in Top-1 accuracy on SSv2. Moreover, increasing the number of frames to 32 improves the performance by a further 0.2%, offering diminishing returns. Similar behaviour can be observed on Kinetics in tables 5 & 7.

FIG. 3 shows an example network architecture for producing video recognition predictions using the present techniques. A space-time mixing attention network, dubbed "XViT", can be created by stacking a number of XViT space-time mixing attention modules over one another. The network is prepended by an embed to tokens module that extracts patches from the sparsely sampled frames (i.e. tokens) and linearly projects them to 1×C. Since attention modules are permutations invariant, a temporal encoding is injected into the tokens. Finally, the proposed modules produce a set of T tokens that are feed into one temporal attention layer that produces a final representation that is used to produce the final output using a linear classifier. The input is a set of sparsely sampled frames form a given sequence, and the output is a video recognition prediction.

FIG. 4 shows a flowchart of example steps for performing video recognition using a transformer-based ML model. The method begins by receiving a video comprising a plurality of frames, the video depicting at least one feature to be identified (step S100). The video may be a video that is stored on the device on which the method is being performed, or may be received in real-time as the video is being captured.

The method comprises defining a temporal window comprising at least three frames from the received video (step S102). The temporal window may comprise adjacent frames of the plurality of frames of the video. Alternatively, the temporal window may comprise non-adjacent frames of the plurality of frames of the video. The temporal window may comprise up to five frames of the plurality of frames of the video.

Defining a temporal window may comprise: dividing each frame of the plurality of frames into a plurality of patches, and adding position information and temporal information to each patch; selecting at least three frames from the plurality of frames; selecting, using the position information, a patch located at an identical position within each of the at least three frames; and defining a temporal window using the selected patches. As noted above, transformer-based models have been used successfully for natural language processing. To enable a transformer-based model to process a video or image, each frame or image is divided into patches so that a sequence of linear embeddings of these patches can be input into the transformer. Image patches are treated the same way by the transformer as tokens (i.e. words) in a natural language processing application.

The method may further comprise: forming a patch sequence using the selected patches; and prepending a classification token to the patch sequence.

Prior to processing the patch sequence using the transformer-based ML model, the method may comprise shifting a predefined number of channels of each patch to another patch in the temporal window (step S104), such that each patch contains channels from different times. Advantageously, space-time mixing is used to attend, jointly, spatial and temporal locations without inducing any additional cost on top of the spatial-only attention model. Shifting means that for each patch at time t, some of the channels of that patch will be sourced from the same patch (i.e. the same position within another frame in the temporal window) at a different point in time. This means that the patches are temporally-mixed, which in turn means that only spatial attention needs to be performed. Advantageously, this reduces the complexity of the spatio-temporal attention from quadratic in both the spatial and temporal terms to linear in the temporal term. The mixing technique simultaneously prevents performance degradation and increases robustness. Channel shifting has the advantage of reducing the dimensionality of the output from the Transformer model, thereby providing further efficiency gains for devices running the present techniques.

When the temporal window comprises patches from a first frame, a second frame and a third frame, shifting a predefined number of channels comprises: shifting a predefined number of channels from the first frame to the second frame; and shifting the predefined number of channels from the third frame to the second frame. For example, the first frame may be t−1, the second frame may be t, and the third frame may be t+1. Thus, some channels from the t−1th frame may be shifted to the t-th frame, and similarly, some channels form the t+1th frame may be shifted to the t-th frame.

In one example, the predefined number may be a quarter of a total number of channels for each patch/frame. That is, in the example above, 25% of the channels from the t−1th frame and the t+1th frame may be shifted to the t-th frame. In this way, the current patch, taken from the t-th frame, may comprise 50% of the channels from the current patch and 25% from a previous (backward) patch and 25% from a subsequent (forward) patch.

In another example, the predefined number may be up to half of a total number of channels for each patch.

The method may further comprise performing a single spatial attention, using the transformer-based ML model, over the frames in the temporal window to identify at least one feature (step S106).

Performing spatial attention using the transformer-based ML model (step S106) may comprise: inputting the patch sequence and classification token into transformer layers of the transformer-based ML model to perform spatial-only attention.

The method may further comprise performing temporal averaging on the classification tokens appended to each patch sequence to obtain a feature for input into a classifier of the transformer-based ML model.

Once the feature has been classified, the method may further comprise storing the received video together with: at least one class as determined by the classifier, and information indicating when the at least one class appears in the video. In this way, the video is stored with at least one class, and the feature matching the class can be readily located in the video. The latter is particularly useful if the video is longer than a few minutes for example.

The method may further comprise moving the temporal window along the plurality of frames of the video and repeating the feature identification process (i.e. repeating steps S102 to S106). That is, once the processing (steps S102 to S106) has been performed using one set of patches, it may be continued using another set of patches. The patches in each set may overlap.

Figure 5:
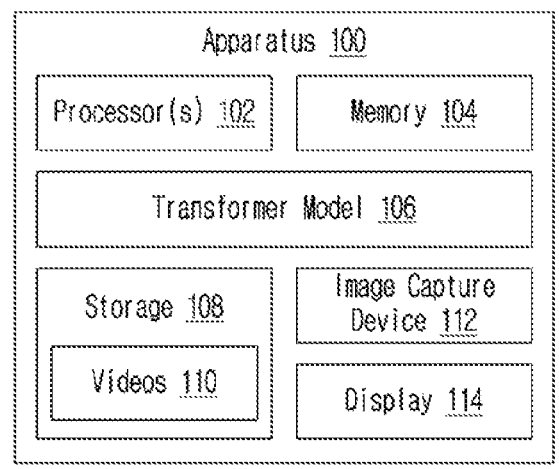
FIG. 5 shows a schematic diagram of an apparatus for performing video recognition.

FIG. 5 shows a schematic diagram of an apparatus 100 for performing video recognition. The apparatus 100 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices.

The apparatus 100 comprises at least one processor 104 coupled to memory 106. The at least one processor 104 may comprise one or more of: a microprocessor, a microcontroller, and an integrated circuit. The memory 106 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 100 comprises a trained transformer-based model 106, which has been trained to perform video recognition as described above.

The at least one processor 104 may be arranged to: receive a video comprising a plurality of frames, the video depicting at least one feature to be identified; define a temporal window comprising at least three frames from the received video; and perform a single spatial attention, using the transformer-based ML model 106, over the frames in the temporal window to identify at least one feature. The processor 104 may perform the steps described above with reference to FIG. 4, and thus, these steps are not explained again.

The apparatus 100 comprises one or more interfaces to enable the apparatus 100 to receive inputs and/or provide outputs.

For example, the apparatus may further comprise at least one image capture device 112 configured to capture the video comprising a plurality of frames. The image capture device 112 may be a camera.

When the apparatus comprises at least one image capture device 112, the at least one processor may analyse the (received) video captured by the image capture device 112 in real-time using the feature identification process described above. Thus, advantageously, the present techniques can not only be used on resource-constrained devices, but can also be used in real-time to analyse videos being captured by the at least one image capture device in real- or near real-time.

Real-time analysis may be useful for a number of reasons. For example the at least one processor may be used to: identify using the analysing, one or more actions or gestures in the received video; and/or identify, using the analysing, one or more objects in the received video. Gesture or action recognition may be useful because it may enable a user to control the video capture process using actions.

It may also enable a capture mode of the image capture device to be adjusted based on what objects or actions or gestures are identified in the video. For example, when the video recognition process determines that the video features a sport being played or other fast-moving action, then it may be useful for the capturing mode to change (to, for example, a more suitable number of frames per second, or to slow motion mode, or at a very high resolution) so that the action can be better recorded. Thus, the at least one processor may be used to: control a capture mode of the at least one image capture device in response to the analysing.

Figure 7:
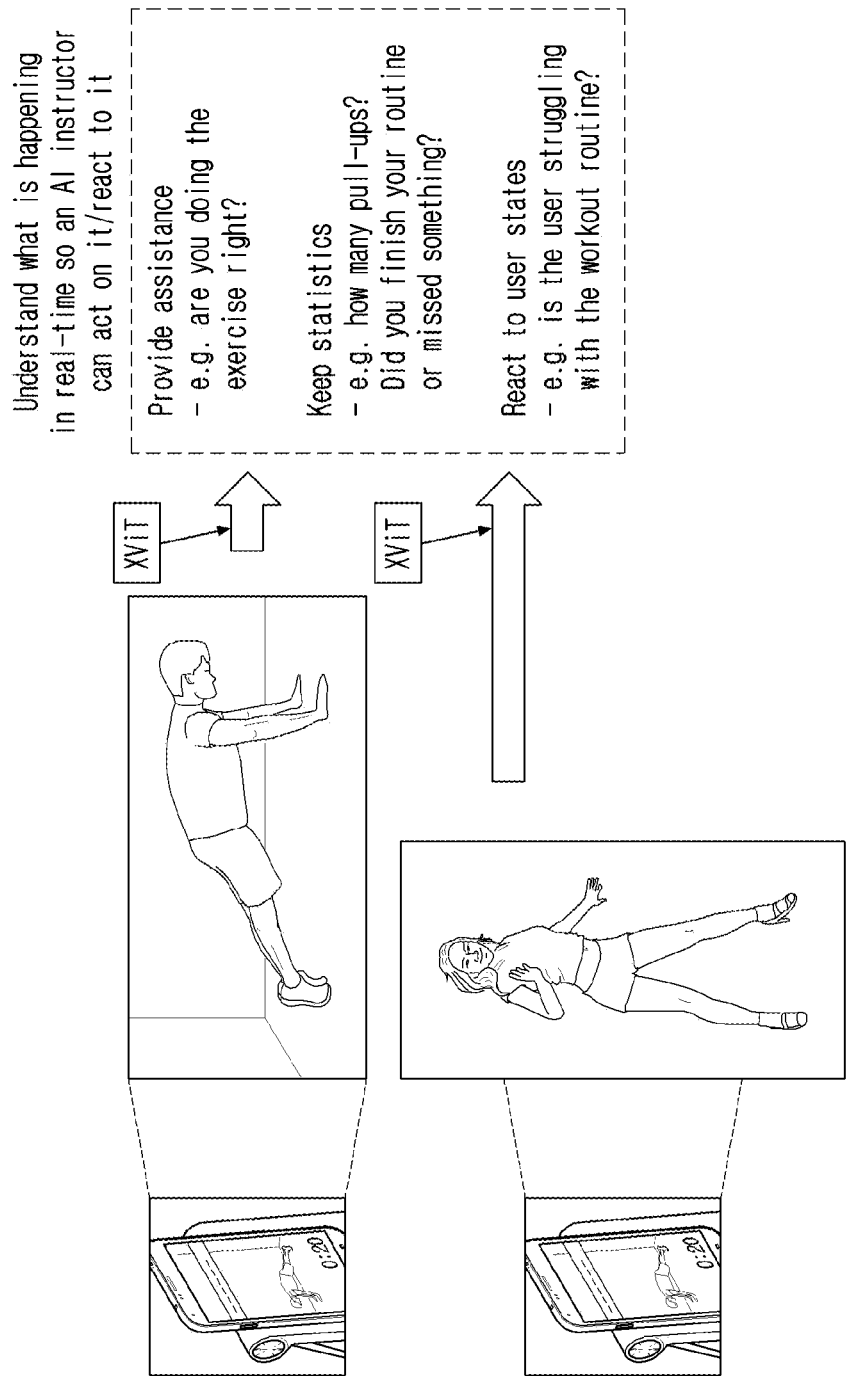
FIG. 7 shows an example use of using the present techniques to analyse a video in real-time.

In another example, the received video may comprises a user performing at least one action, such as cooking or exercise. FIG. 7 shows an example use of using the present techniques to analyse a video in real-time. The at least one processor may be arranged to: provide feedback to the user, via a user interface, based on the at least one action performed by the user. This may enable an AI instructor or AI assistant to understand what the user is doing in real-time and provide suitable information to the user. For example, the AI instructor/assistant may provide assistance or guidance to the user if the user does not appear to be performing an exercise correctly, or may provide motivational information to the user to encourage them to continue performing the exercise. The user's emotional state may be determined using the video recognition process and this may enable the AI instructor to react to the user's emotional state. For example, if the user is struggling with an exercise routine, the AI instructor may output motivational information or may encourage the user to take a short break.

The apparatus 100 may comprise storage 108 storing at least one video 110; and at least one interface for receiving a user query. For example, the apparatus may comprise a display 114, or any other suitable interface such as a microphone, speaker, camera, touchscreen, keyboard, and so on.

Figure 6:
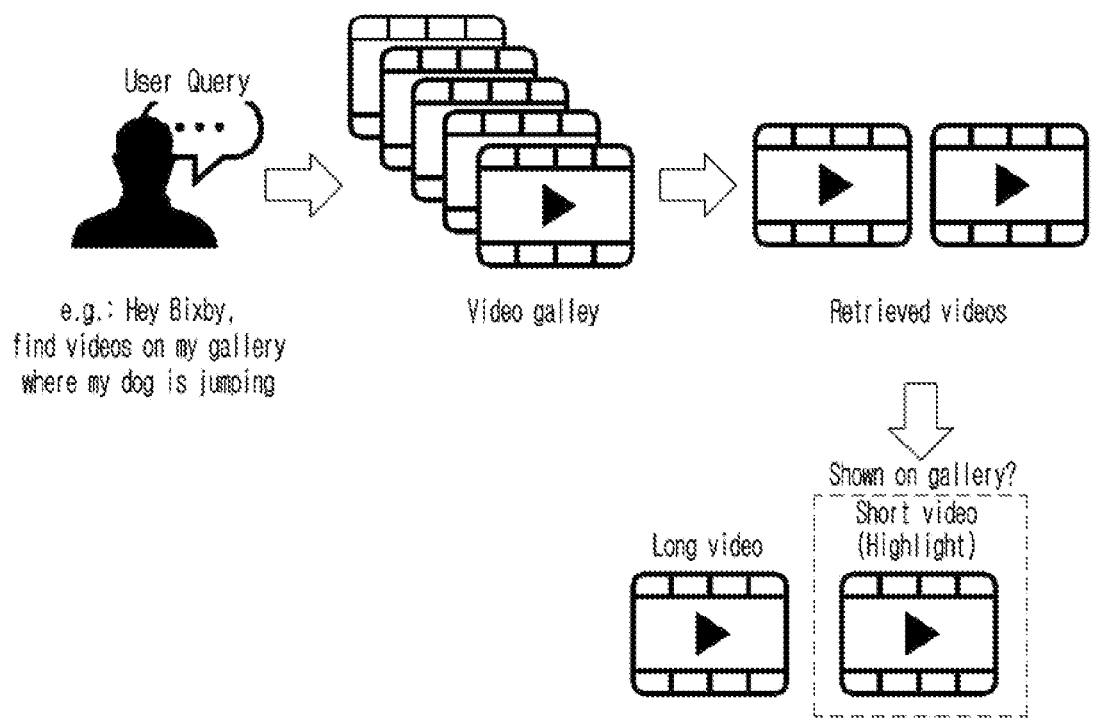
FIG. 6 shows an example use of the present techniques to query a video gallery.

The video recognition process may also function on pre-recorded videos 110. The at least one processor 102 may be arranged to: receive, via the at least one interface, a user query requesting any video from the storage 108 that contains a specific feature; use the feature identification process to identify any video containing the specific feature; and output each video containing the specific feature to the user via the at least one interface. FIG. 6 shows an example use of the present techniques to query a video gallery. In this example, the user query may be "Hey Bixby, find videos on my gallery where my dog is jumping". The feature identification process may be used to identify any video in the storage that shows the user's dog jumping, and then these videos may be output to the user. The user may speak or type their query, and the output may be displayed on a display screen of the apparatus or a response may be output via a speaker (e.g. "We have found two videos of your dog jumping").

In this example, the at least one processor 102 may be arranged to store, with each video containing the specific feature: the class corresponding to the specific feature, and information indicating when the class appears in the video. Thus, the identified videos may be labelled with the class such that the videos can be output in the future without needing to perform the feature identification process again (for the same feature(s)).

In another example, the videos may already be classified. The apparatus 100 may further comprise: storage 108 storing a plurality of videos 110, wherein each video is labelled with at least one class and information indicating when the at least one class appears in the video; and at least one interface for receiving a user query. The at least one processor 102 may be arranged to: receive, via the at least one interface, a user query requesting any video from the storage that contains a specific feature; search the storage for any video labelled with a class corresponding to the specific feature; and output each video containing the specific feature to the user via the at least one interface. Thus, as the videos have already been labelled, the processor may simply perform a search using the class/labels. The classification of the videos may be performed on user command, or may be automatically performed when a new video is stored. In the latter case, the video recognition process may be automatically performed when the apparatus is not being used by the user, such as when the apparatus is being charged or when the apparatus is in 'sleep mode' (defined by the user based on when they go to sleep), so that the resources of the apparatus are not used at a time when the user needs to use the apparatus for another purpose.

As shown in FIG. 6, the at least one processor may output a whole video containing the specific feature or a segment of the video containing the specific feature, wherein the segment includes the specific feature. That is, the whole video may be output where the specific feature is located somewhere in the video, or a highlight segment may be output which shows the specific feature itself. The highlight segment is advantageous when the whole video is more than a few minutes long. For example, the whole video may be of the user's child playing a football game, but the user may only want to see the part in the video where the user's child scores a goal. The whole video may be over an hour long, so the highlight segment is useful as it means the user does not have to watch or skip through the video to find the moment when the user's child scores a goal.

It will be appreciated that each video may yield multiple recognition predictions, as will be familiar to those skilled in the art of image and video classification. For example, a set of recognition results for a video in the present example may be {Person: Dog}, with the result "Dog" qualifying the video for inclusion in the set of videos presented to the user as satisfying the query.

It will also be appreciated that analysis of the videos may be run in response to the query, or video analysis consistent with the present techniques may have been run previously (e.g. sometime between the video being stored on the device and the user making the query), with the recognition results stored by the device for later retrieval when queried. It will also be appreciated that the recognition results are not limited to objects, people, animals and the like but may also include events, actions, video recording effects (e.g. slow motion or zoom in the video), and so on.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer implemented method for performing video recognition using a transformer-based machine learning, ML, model, the method comprising:
   receiving a video comprising a plurality of frames, the video depicting at least one feature to be identified;
   defining a temporal window comprising at least three frames from the received video; and performing a single spatial attention, using the transformer-based ML model, over the frames in the temporal window to identify at least one feature,
wherein defining the temporal window comprises:
dividing each frame of the plurality of frames into a plurality of patches, and adding position information and temporal information to each patch;
selecting the at least three frames from the plurality of frames;
selecting, using the position information, a patch located at an identical position within each of the at least three frames; and
defining the temporal window using the selected patches and space-time mixing the patches in the at least three frames.

2. The method as claimed in claim 1 further comprising:
forming a patch sequence using the selected patches; and
prepending a classification token to the patch sequence.

3. The method as claimed in claim 2 wherein performing spatial attention using the transformer-based ML model comprises:
inputting the patch sequence and classification token into transformer layers of the transformer-based ML model to perform spatial-only attention.

4. The method as claimed in claim 3 further comprising performing temporal averaging on the classification tokens appended to each patch sequence to obtain a feature for input into a classifier of the transformer-based ML model.

5. The method as claimed in claim 4 further comprising:
storing the received video together with:
at least one class as determined by the classifier, and
information indicating when the at least one class appears in the video.

6. The method as claimed in claim 1, wherein defining the temporal window further comprises:
shifting a predefined number of channels of each patch to another patch in the temporal window, such that each patch contains channels from different times.

7. The method as claimed in claim 6 wherein when the temporal window comprises patches from a first frame, a second frame and a third frame, shifting a predefined number of channels comprises:
shifting a predefined number of channels from the first frame to the second frame; and
shifting the predefined number of channels from the third frame to the second frame.

8. The method as claimed in claim 7 wherein the predefined number is a quarter of a total number of channels for each patch.

9. The method as claimed in claim 7 wherein the predefined number is up to half of a total number of channels for each patch.

10. The method as claimed in any of claim 1 wherein the temporal window comprises adjacent frames of the plurality of frames of the video.

11. The method as claimed in any of claim 1 wherein the temporal window comprises non-adjacent frames of the plurality of frames of the video.

12. The method as claimed in any of claim 1 wherein the temporal window comprises up to five frames of the plurality of frames of the video.

13. The method as claimed in claim 1 further comprising moving the temporal window along the plurality of frames of the video and repeating the feature identification.

14. A non-transitory computer-readable storage medium comprising instructions which, when executed by a processor, causes the processor to carry out the method of any of claim 1.

15. An apparatus for performing video recognition using a transformer-based machine learning, ML, model, the apparatus comprising:
at least one processor coupled to memory and arranged to:
receive a video comprising a plurality of frames, the video depicting at least one feature to be identified;
define a temporal window comprising at least three frames from the received video; and
perform a single spatial attention, using the transformer-based ML model, over the frames in the temporal window to identify at least one feature,
wherein defining the temporal window comprises:
dividing each frame of the plurality of frames into a plurality of patches, and adding position information and temporal information to each patch;
selecting the at least three frames from the plurality of frames;
selecting, using the position information, a patch located at an identical position within each of the at least three frames; and
defining the temporal window using the selected patches and space-time mixing the patches in the at least three frames.

16. The apparatus as claimed in claim 15 further comprising:
at least one image capture device configured to capture the video comprising a plurality of frames.

17. The apparatus as claimed in claim 16 further comprising:
analysing, using the at least one processor, the received video in real-time using the feature identification.

18. The apparatus as claimed in claim 17 further comprising using the at least one processor to:
identify using the analysing, one or more actions or gestures in the received video; and/or
identify, using the analysing, one or more objects in the received video.

19. The apparatus as claimed in claim 17 further comprising using the at least one processor to:
control a capture mode of the at least one image capture device in response to the analysing.

* * * * *